Patented Jan. 5, 1954

2,665,277

UNITED STATES PATENT OFFICE 2,665,277

MONOBASIC MORPHINE PHOSPHATE HEMIHYDRATE AND PROCESS OF PREPARING SAME

August H. Homeyer, Webster Groves, George B. De La Mater, St. Louis County, and Andrew A. Cochran, Ferguson, Mo., assignors to Mallinckrodt Chemical Works, St. Louis, Mo., a corporation of Missouri No Drawing. Application October 17, 1950, Serial No. 190,673

11 Claims. (Cl. 260—285)

This invention relates to narcotics and more particularly to a new salt of morphine.

Among the objects of this invention are the provision of a new and improved salt of morphine; the provision of a new salt of morphine that is more soluble and more stable than salts known and commonly employed heretofore; the provision of a new and more conveniently handled salt of morphine; and the provision of methods for preparing monobasic morphine phosphate. Other features will be in part apparent and in part pointed out hereinafter.

Briefly, the present invention provides a monobasic phosphate of morphine which is rapidly soluble in water, stable and convenient to handle, and methods for preparing this salt.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Unless carefully protected, morphine sulfate, $(C_{17}H_{19}O_3N)_2.H_2SO_4.5H_2O$, readily loses a part of its large amount of water of crystallization, even at moderate temperatures, with resulting discoloration and formation of insoluble matter. The sulfate hydrate dissolves slowly and requires about fifteen times its own weight of water for complete solution at 25° C. Moreover, the crystals as normally formed are long and slender and exhibit a marked tendency to form bulky, fluffy masses which do not flow easily. In spite of the inherent difficulties in handling this salt, it is the one most commonly used because of its relative stability compared with other known salts of morphine that are somewhat more soluble.

Of the other salts of morphine that have been studied, the phosphate has apparently received little attention because of its reputed insolubility. A polybasic morphine phosphate was first reported by Pettenkofer in about 1817 (Repert. Pharm. 4, 45). It was obtained by evaporation of a neutral aqueous solution of morphine and phosphoric acid. In more modern times the accepted composition of the slightly soluble phosphate has been given as $(C_{17}H_{19}O_3N)_3.(H_3PO_4)_2.7H_2O$ Repetition of Pettenkofer's work gave a dibasic salt, $(C_{17}H_{19}O_3N)_2.H_3PO_4.xH_2O$, which is only slightly soluble in water.

A third phosphate, heretofore unknown, has now been found. It is monobasic morphine phosphate, $C_{17}H_{19}O_3N.H_3PO_4.\frac{1}{2}H_2O$, the valuable properties of which are particularly surprising in view of the properties of the previously known morphine phosphates. It dissolves rapidly and it is soluble in only about five times its own weight of water. At moderately elevated temperatures, this new morphine phosphate exerts only about one-half the aqueous vapor tension of morphine sulfate. The water of crystallization is therefore much more firmly bound, and the salt is stable under storage conditions that would produce rapid and serious deterioration of morphine sulfate. This phosphate undergoes less discoloration when exposed to light than does morphine sulfate. The crystal habit of this new salt is also desirable. The crystals of monobasic morphine phosphate, as produced by this invention, are prisms having a substantially smaller ratio of length to breadth than is typical of morphine sulfate. The new phosphate is only about one-half as bulky as the sulfate and, being free from any tendency to form masses, it flows much more easily and is a more convenient product to handle in numerous manufacturing operations.

Monobasic morphine phosphate hemihydrate is prepared by reacting equimolar quantities of morphine alkaloid and phosphoric acid. It can be crystallized from a concentrated aqueous solution; but smaller, more convenient crystals are obtained by crystallizing the product from a mixture of water and a water-miscible organic solvent. The latter may be added to a concentrated aqueous solution of the phosphate or morphine and phosphoric acid may be reacted in a mixture of the solvents. The preferred organic solvents are water-miscible alcohols, ketones, and ethers; for example, methanol, ethanol, normal propanol, isopropanol, tertiary butanol, acetone, dioxane, and the dimethyl ether of ethylene glycol. In general, monohydroxy alcohols are preferable to polyhydroxy alcohols such as glycerin and ethylene glycol.

EXAMPLE 1

Morphine alkaloid (100 g.) was suspended in water (500 ml.) and 85% phosphoric acid (40 g.) was added, whereupon all of the alkaloid dissolved. The acid solution was warmed and boiling ethyl alcohol (1500 ml.) was added. The resulting mixture was then cooled and stirred. A fine, white crystalline precipitate of monobasic morphine phosphate hemihydrate soon formed and this was filtered off, washed with alcohol and dried. The yield was 109 g. Morphine alkaloid was recovered from the mother liquor by precipitation with ammonium hydroxide after first evaporating off the alcohol.

The empirical formula of the phosphate, $C_{17}H_{19}O_3N \cdot H_3PO_4 \cdot \frac{1}{2}H_2O$, is confirmed by the following analytical data:

|  | Found | Calculated for [1] |
|---|---|---|
|  | Percent | Percent |
| Percent anhydrous morphine alkaloid | 72.77 | 72.73 |
| Percent $H_2O$ | 2.33 | 2.29 |

[1] $C_{17}H_{19}O_3N \cdot H_3PO_4 \cdot \frac{1}{2}H_2O$.

The pH of a 1% aqueous solution is about 4.6 at 25° C.

The following crystallographic and optical properties of the monobasic morphine phosphate hemihydrate were determined microscopically:

Crystallographic properties

*Crystal systems.*—Monoclinic.
*Form and habit.*—Crystals prepared from water alone or mixtures of water and organic solvents are elongated parallel to the c axis and show the prism form {110} and basal pinacoid {001}. Occasionally the additional forms {100} and {010} are observed.
*Axial ratio.*—a:b=1.38:1.
*Beta angle.*—112°.
*Terminal profile angle.*—Lying on {001}, 72° (bisected by plane of symmetry); lying on {110}, 72°.

Optical properties

*Birefringence.*—Strong.
*Optical axial angle.*—Large, 2V>70°.
*Dispersion.*—Slight, r>v.
*Optic axial plane.*—010.
*Sign of double refraction.*—Negative.
*Acute bisectrix.*— a∧a=5° in acute angle beta.
*Extinction angle.*—Lying on {110}, slow vibration direction at 45° to c in acute terminal angle.
*Interference figure.*—Lying on {101} uncentered acute bisectrix.

EXAMPLE 2

To a solution containing the equivalent of 1 g. of monobasic morphine phosphate in 5 ml. of warm water was added methyl alcohol (20 ml.). On cooling this mixture with stirring, a crystalline precipitate of monobasic morphine phosphate hemihydrate was formed in good yield.

EXAMPLE 3

Example 2 was repeated except that acetone (15 ml.) was employed instead of methyl alcohol. On cooling the mixture with stirring, a crystalline precipitate of monobasic morphine phosphate hemihydrate was formed in good yield.

EXAMPLE 4

Example 2 was again repeated, this time using ter.-butyl alcohol (15 ml.). Again a crystalline precipitate of monobasic morphine phosphate hemihydrate was formed in good yield.

EXAMPLE 5

Example 2 was again repeated except that dioxane (15 ml.) was used as the organic solvent. Monobasic morphine phosphate hemihydrate was formed in good yield.

EXAMPLE 6

Example 2 was again repeated except that the dimethyl ether of diethylene glycol was used as the organic solvent. Monobasic morphine phosphate hemihydrate was formed in good yield.

EXAMPLE 7

Morphine alkaloid (1 g.) was dissolved in hot methyl alcohol (7 ml.) and a solution of 85% phosphoric acid (0.4 g.) in water (2 ml.) was added. On cooling the mixture with stirring a precipitate of monobasic morphine phosphate hemihydrate was obtained in good yield.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:
1. Monobasic morphine phosphate hemihydrate.
2. The method of preparing monobasic morphine phosphate hemihydrate which comprises mixing approximately equimolar quantities of morphine alkaloid and phosphoric acid.
3. The method of preparing monobasic morphine phosphate hemihydrate which comprises mixing approximately equimolar quantities of morphine alkaloid and phosphoric acid, and recovering monobasic morphine phosphate hemihydrate by crystallization from an aqueous solution.
4. The method of preparing monobasic morphine phosphate hemihydrate which comprises mixing approximately equimolar quantities of morphine alkaloid and phosphoric acid, and recovering monobasic morphine phosphate hemihydrate by crystallization from a mixture of water and a water-miscible organic solvent.
5. The method of preparing monobasic morphine phosphate hemihydrate in crystalline form which comprises crystallizing monobasic morphine phosphate hemihydate from a mixture of water and an organic solvent.
6. The method of preparing monobasic morphine phosphate hemihydrate which comprises mixing approximately equimolar quantities of morphine alkaloid and phosphoric acid in the presence of water and a water-miscible organic solvent selected from the group consisting of ketones, ethers and alcohols.
7. The method of preparing monobasic morphine phosphate hemihydrate which comprises mixing approximately equimolar quantities of morphine alkaloid and phosphoric acid in the presence of water and methanol.
8. The method of preparing monobasic morphine phosphate hemihydrate which comprises mixing approximately equimolar quantities of morphine alkaloid and phosphoric acid in the presence of water and ethanol.
9. The method of preparing monobasic morphine phosphate hemihydrate which comprises mixing approximately equimolar quantities of morphine alkaloid and phosphoric acid in the presence of water and n-propanol.

10. The method of preparing monobasic morphine phosphate hemihydrate which comprises mixing approximately equimolar quantities of morphine alkaloid and phosphoric acid in the presence of water and isopropanol.

11. The method of preparing monobasic morphine phosphate hemihydrate which comprises mixing approximately equimolar quantities of morphine alkaloid and phosphoric acid in the presence of water and acetone.

AUGUST H. HOMEYER.
GEORGE B. DE LA MATER.
ANDREW A. COCHRAN.

References Cited in the file of this patent

Handbook of Chemistry and Physics, 25th ed., Chemical Rubber Publishing Co., Cleveland, Ohio, p. 408.